Patented Feb. 10, 1953

2,628,180

UNITED STATES PATENT OFFICE 2,628,180

METHOD OF UNITING POLYSTYRENE TO OTHER SURFACES USING STYRENE MONOMER ADHESIVES

Robert L. Iverson, Beaver Falls, Pa., assignor to Koppers Company, Inc., Pittsburgh, Pa., a corporation of Delaware No Drawing. Application August 5, 1948, Serial No. 42,749

14 Claims. (Cl. 154—139)

This invention relates to polystyrene adhesives. More particularly the invention relates to an adhesive which is adapted for uniting polystyrene bodies to other solid bodies with a strong durable joint.

Polystyrene bodies and adhesive have been united to other solid bodies, such as polystyrene, metal, glass, wood and the like, by applying to the surface of the polystyrene body or bodies to be united, a solvent which forms a sticky film, then pressing the bodies to be united together while the film is still tacky and holding the bodies together until the uniting film has set. The solvents, such as benzene, acetone, methylethylketone, ethyl acetate, and the like are very active solvents so that it is difficult to have the cementing film set or cure without shrinkage to open or form cracks in the joint and to become hard and brittle.

Further these active solvents mar and etch the polystyrene surface with which they come into contact and thus often spoil the appearance of the body being worked upon or the joint being made.

The primary object of the present invention is to provide an adhesive for uniting polystyrene bodies with other solid bodies by a strong tough joint.

Another object of the invention is to provide a polystyrene adhesive which has solvent retardant characteristic adapted to avoid non-continuous and etched joints and marred surfaces.

With these and other objects in view the invention consists in the polystyrene adhesive hereinafter described and particularly defined in the claims.

The preferred adhesive is composed of styrene monomer which is a very effective solvent for dissolving the polystyrene which is to be united with some other solid body. Styrene monomer itself does not have the most desirable solvent characteristic for adhesive because it is too active as a solvent to give the desired solid tough joint. I have found that an excellent adhesive may be made in which the amount of styrene monomer may be varied from 80 to 99% and the solvent and the evaporation characteristics of the monomer may be modified by a retarder, preferably a stearate retarder. By using from 1 to 20% of butylcellosolve stearate (butoxyethyl stearate) or butylstearate, the rate of solvent action and the rate of evaporation of the mixture may be modified so that the adhesive will get a quick set and will harden rapidly to give a strong joint. About 5% stearate retarder with 95% styrene monomer is preferred for most uses. The butylstearate mentioned above also acts as solvent for the polystyrene and helps to form a polystyrene film which is a part of the adhesive. The retarder with the styrene monomer polymerizes to form a solid hard joint. The retarder not only modifies the rate and character of curing of the joint, but upon aging makes the joint very hard and still it is tough as distinguished from being brittle. The combination of styrene monomer with butylstearate, particularly butylcellosolvestearate, does not shrink sufficiently to allow cracks to form in the adhesive joint but forms a continuous solid connection between the polystyrene and the other solid body to be united with the polystyrene body.

The adhesive described above is a mobile fluid which may be applied to the surfaces to be united by dipping, or it may be applied with a dropper or syringe. When the adhesive is applied it has a low surface tension and will flow from one to two inches from the point of application so that it readily fills the joint to be united. This surface tension characteristic of the adhesive is important in that it allows a joint to be effectively made with a minimum amount of material.

Several stearate solvent retarders may be effectively used with styrene monomer to make a good adhesive, for example, methyl, ethyl, isopropyl, and butyl stearates and methyl, ethyl and iso propyl cellosolvestearates (the alkoxy ethyl stearates) may be used in about the same proportions as butylcellosolve stearate. All of these stearates have alkyl groups with one to four carbon atoms.

The mixture of styrene monomer with the retarder (butylcellosolve stearate) has a natural tendency to polymerize and solidify. To keep the adhesive in the form of a mobile liquid having a low surface tension, a small amount of a polymerization inhibitor may be added to the adhesive at the time that it is prepared. Such inhibitors are tertiary butylcatechol, 2,4-dichloro-6-nitrophenol, and hydroquinone. All of these hydroxybenzenes are quite effective in preventing the polymerization of the styrene while the mobile liquid adhesive is held in a closed container. It has been found that from 200 to 500 parts per million of the inhibitor based on the weight of the mixture of styrene monomer and solvent retarder is effective in preventing the polymerization of the adhesive when it is held in a closed container against evaporation. Such a mixture may be held in a closed container for a period of six to eight months without deterioration. Still, when this material is opened to the atmosphere to permit evaporation of the styrene monomer, the adhesive will quickly develop an initial set and will continue to cure for final set and become a hard continuous joint filler.

If the adhesive is to be used promptly after being made, it is not essential that a polymerization inhibitor should be added to the adhesive.

The mixture of styrene monomer with the solvent retarder is preferably in such a proportion that the solvent power of the adhesive will be controlled to prevent etching and marring of the polystyrene. The adhesive has a relatively small evaporation action which relieves the stresses in the polystyrene and allows the joint to set without the formation of cracks.

The initial set of the improved adhesive is very fast. For example, the parts being united may be relieved from pressure or withdrawn from the clamp in less than five minutes after the adhesive is applied in the joint and the joined parts may be packed within two hours after the parts are united. The permanent hard set of the adhesive takes place within a few days.

The solvent action of the preferred adhesive and the evaporation rate is such that a clear bubble-free joint will be made when uniting the parts and this joint has a great strength.

When uniting parts in dry assembly the parts may be placed together and united by applying the adhesive with a small brush, a syringe or an eye-dropper, and in wet assembly the parts may be wiped with the adhesive or may be dipped into the adhesive, or the adhesive may be applied with a brush. The relatively slow solvent rate is very advantageous in the wet assembly of parts with the adhesive. The adhesive may be mixed with polystyrene in the proportion of four parts of adhesive to one part of polystyrene to form a cement for filling the gap between poorly matched joints between the polystyrene and the part to be attached thereto.

The improved adhesive may be readily colored to match the color of the bodies with which the adhesive is to be used by mixing it with dyes or pigments of the type used for coloring polystyrene. Also, if the adhesive is to be used for filling cavities in the body to be united, fillers such as wood flour, alpha flock, diatomaceous earth, clay, powdered glass, mica, quartz, iron oxide, titanium oxide, limestone and calcium sulphate may be added to the adhesive before it is used in making a joint. Depending upon the type of joint, from 0.1 to 1 part of any of the above fillers, or a mixture of the above fillers, may be added to one part of the adhesive composed of styrene monomer and stearate to be used for filling cavities.

When it is desired to make a very hard joint, from 100 to 200 parts per million of the adhesive of benzoyl peroxide may be added to the adhesive not more than thirty days before, or at the time that the adhesive is to be used.

The preferred form of the invention having been thus described, what is claimed as new is:

I claim:

1. A composition which comprises 1 to 20 per cent of a solvent and evaporation retarder selected from the class consisting of alkoxyethyl stearates in which the alkoxy group contains not more than four carbon atoms and the balance essentially styrene monomer.

2. A composition consisting of 1 to 20 per cent of a solvent and evaporation retarder selected from the class consisting of alkoxyethyl stearates in which the alkoxy group contains not more than four carbon atoms and the balance substantially all styrene monomer.

3. The composition of claim 1 in which the styrene monomer is inhibited against polymerization and is free of substances which promote formation of polystyrene.

4. The composition of claim 3 in which the styrene monomer contains from 0.02 to 0.05 per cent of a polymerization inhibitor selected from the class consisting of tert-butyl catechol, 2,4-dichloro-6-nitrophenol, and hydroquinone.

5. The composition of claim 4 in which the solvent and evaporation retarder is butoxyethyl stearate.

6. The composition of claim 2 in which the solvent and evaporation retarder is butoxyethyl stearate.

7. A composition of matter comprising 80 to 99 parts of styrene monomer and 1 to 20 parts of butoxyethyl stearate, said styrene monomer and said butoxyethyl stearate totaling substantially 100 parts.

8. In a method for uniting a polystyrene body with another solid body in which the union is effected by applying a solvent consisting essentially of styrene monomer to the styrene surfaces to be united, pressing the bodies together to secure an initial set and thereafter allowing the styrene monomer to evaporate, the improvement which comprises incorporating in the styrene monomer before said application from 1 to 20 per cent of a solvent and evaporation retarder selected from the class consisting of alkyl stearates and alkoxyethyl stearates in which the alkyl and alkoxy groups contain not more than four carbon atoms whereby to inhibit etching of the polystyrene by the styrene monomer.

9. The method of claim 8 in which the styrene monomer is inhibited against polymerization.

10. The method of claim 9 in which the styrene monomer contains from 0.02 to 0.05 per cent of a polymerization inhibitor selected from the class consisting of tert-butyl catechol, 2,4-dichloro-6-nitrophenol, and hydroquinone.

11. The method of claim 10 in which the solvent and evaporation retarder is butyl stearate.

12. The method of claim 10 in which the solvent and evaporation retarder is butoxyethyl stearate.

13. The method of claim 8 in which the solvent and evaporation retarder is butyl stearate.

14. The method of claim 8 in which the solvent and evaporation retarder is butoxyethyl stearate.

ROBERT L. IVERSON.

REFERENCES CITED

The following references are of record in the file of this patent:

UNITED STATES PATENTS

| Number | Name | Date |
|---|---|---|
| 1,835,619 | Walsh | Dec. 8, 1931 |
| 2,175,672 | Scott et al. | Oct. 10, 1939 |
| 2,284,335 | Meyer | May 26, 1942 |
| 2,349,508 | Mack | May 23, 1944 |
| 2,446,536 | Hardy | Aug. 10, 1948 |
| 2,455,745 | Erickson | Dec. 7, 1948 |
| 2,486,756 | Murphy | Nov. 1, 1949 |
| 2,501,562 | Cook | Mar. 21, 1950 |
| 2,510,908 | Schubert et al. | June 6, 1950 |

OTHER REFERENCES

Ser. No. 386,860, Daur et al. (A.P.C.), published April 20, 1943.

"Modern Plastics," April 1944, page 183.